July 8, 1969

C. H. GEBO 3,454,887

SYSTEM HAVING MEANS FOR DISCRIMINATING AGAINST UNDESIRED
SIGNAL PHASE AND POLARITY

Filed Nov. 25, 1964

INVENTOR
CHARLES H. GEBO

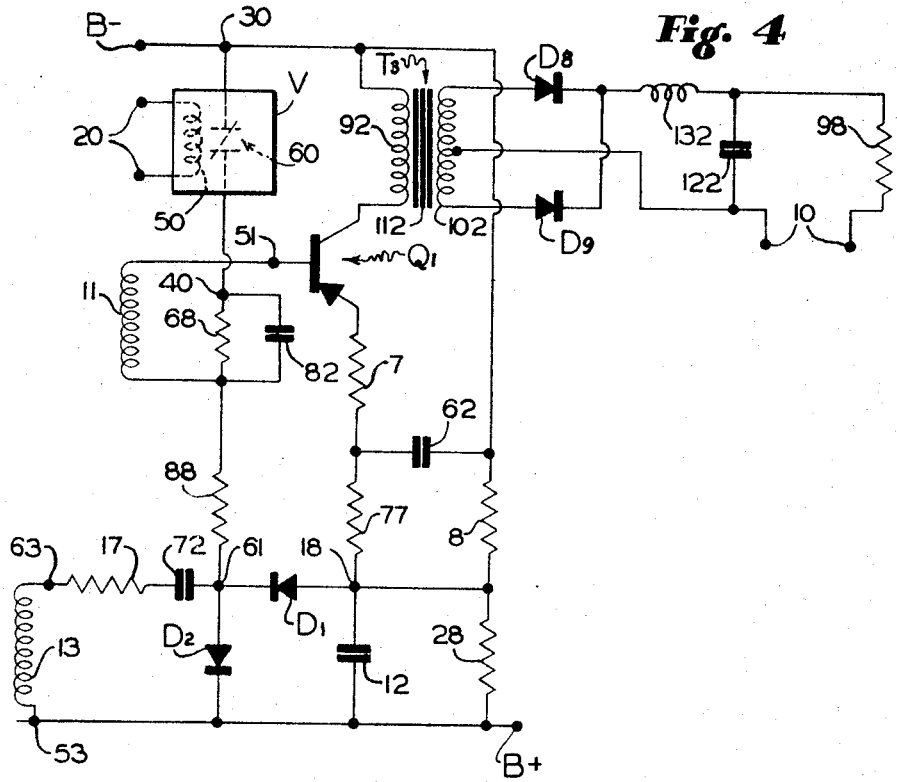
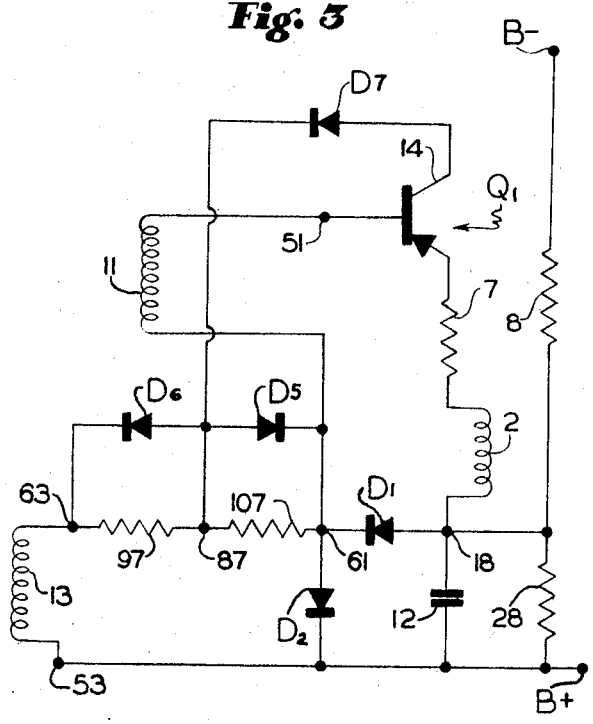
Fig. 4
Fig. 3
INVENTOR
CHARLES H. GEBO

United States Patent Office
3,454,887
Patented July 8, 1969

3,454,887
SYSTEM HAVING MEANS FOR DISCRIMINATING AGAINST UNDESIRED SIGNAL PHASE AND POLARITY
Charles H. Gebo, East Rochester, N.Y., assignor to Taylor Instrument Companies, Rochester, N.Y., a corporation of New York
Filed Nov. 25, 1964, Ser. No. 414,942
Int. Cl. H03f 3/38
U.S. Cl. 330—10    18 Claims

ABSTRACT OF THE DISCLOSURE

A process controller converts DC input signal to AC signal and reconverts the AC signal to DC with a phase-insensitive demodulator the output of which is negatively fed back to the controller input. The AC signal is applied to the modulator via a discriminator which prevents the AC signal from being applied to he demodulaor when it has phase and polarity such as would give the feedback the positive sense.

---

This invention relates to circuitry involving discriminating means, as for example, a DC to DC signal amplifying feedback system having one or more intermediate stages wherein a DC input signal is represented by an AC signal that is ultimately converted to a DC output signal also representing said DC input signal, and there is DC signal feedback around the AC portion of the system. In systems such as these, it is frequently convenient to obtain the said DC output signal by rectifying the said AC signal in a fashion that causes the said DC output signal to have always the same sense or polarity, irrespective of the sense or polarity of the said DC input signal. If the sense of the DC feedback signal follows that of said DC output signal, it is obvious that the overall sense of feedback will change, i.e., the feedback will become positive instead of negative, or vice versa. In general, said DC input signal will represent information relating to the value of a process variable, e.g., temperature or to the deviation of that value from some reference value and the ultimate goal of the feedback system will be to provide for measurement and/or control of said variable.

An object of this invention is to provide novel discriminating means intended to the incorporated in a feedback system for preventing reversal of the sense of the feedback.

More generally speaking, it is an object of this invention to provide novel means for extracting information from an AC wave, wherein such means provides for extracting, from each cycle of said wave, only a part of the information in said cycle.

Other objects will become apparent in the description to follow and in the claims appended hereto.

In the drawings:

FIGURE 3 shows a second discriminating means according to the invention;

FIGURE 4 shows a third discriminating means according to the invention.

Figure 1:
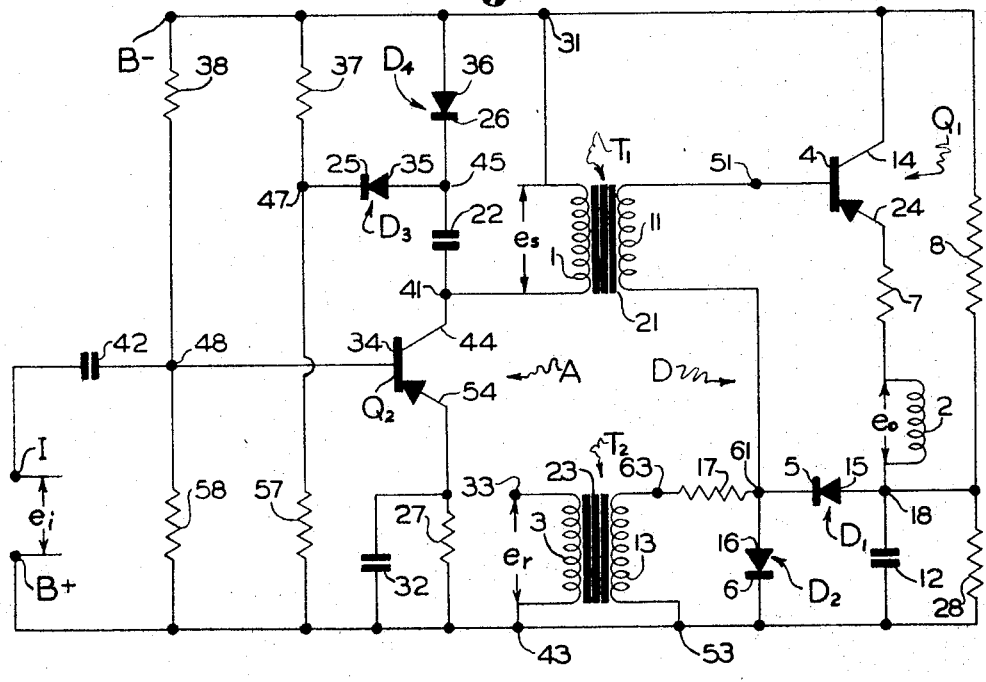
FIGURE 1 shows a cicruit including discriminating means according to the invention.

In FIGURE 1, looking to the right, from reference character D, there is seen discriminator circuitry according to the invention. Looking to the left, from reference character A, there is seen suitable circuitry for providing an AC signal as input to discriminator D.

Circuitries A and D are coupled together by means of a transformer $T_1$, having a primary winding 1 and a secondary winding 11 coupled together by an iron core 21.

The purpose of this transformer coupling is ultimately to produce across an inductance 2 an output voltage $e_0$ containing certain information contained also in a voltage $e_s$ across winding 1.

In this instance, it is desired, in essence, that only such information appear in $e_0$ as exists in $e_s$ when the latter is more negative at terminal 31 than at terminal 41, and there is simultaneously a voltage $e_r$ across a winding 3 such that $e_r$ is more negative at terminal 33 than it is at terminal 43. Winding 3 is the primary winding of a transformer $T_2$ having a secondary winding 13 coupled to primary winding 3 by an iron core 23. Generally speaking, voltages $e_r$ and $e_s$ would have the same AC source, the difference being that voltage $e_s$ represents the source signal amplitude-modulated in accordance with the aforesaid information, whereas $e_r$ represents the source signal unmodulated by said information, whereby said information can be recovered by demodulation. As such usage is old in the art, it is not necessary to dwell on the matter here.

In order to discriminate against the unwanted parts of $e_s$, I provide the transistor $Q_1$, and the diodes $D_1$ and $D_2$, the base 4 of transistor $Q_1$ being connected to that end (in effect, terminal 51) of secondary winding 11 that is more negative than the other end thereof (in effect, terminal 61) when terminal 31 is more negative than terminal 41, and the collector 14 of transistor $Q_1$ being connected to the B— line which powers the circuit of FIGURE 1. It will be seen, for the PNP transistor illustrated in the case of $Q_1$, that $Q_1$ will present an extremely high collector to emitter impedance as long as base 4 is more positive than emitter 24 of transistor $Q_1$.

By connecting emitter 24 to B— via a resistor 7, inductance 2 and a resistor 8, in that order, and connecting the common terminal 18 of inductance 2 and resistor 8 to B+ via a resistor 28, resistors 8 and 28 are caused to act as a voltage divider maintaining emitter 24 at the voltage of terminal 18. Consequently, as long as the voltage of base 4 is more positive than the voltage at terminal 18, the collector-emitter current path is "turned off," so as to speak, as a result of the extremely high impedance thereof.

Since the cathode 5 of diode $D_1$ is connected to terminal 61 and the anode 15 thereof is connected to terminal 18, evidently the collector-emitter circuit of $Q_1$, namely resistor 7, inductance 2, capacitor 12 and the impedance of the power supply (not shown) connected to terminals B+ and B—, will have a current flowing therein whenever terminal 51 is more negative than emitter 24, and this current, and hence the voltage $e_0$ across inductance 2 will represent $e_s$ during the time of such current flow, provided also that diode $D_1$ is conducting at the same time.

However, in view of the condition that the voltage $e_0$ is to exist only when $e_r$ and $e_s$ have the relationship defined previously, I subject the transistor $Q_1$ to control by $e_r$, which is coupled into the circuit D via transformer $T_2$.

Winding 13 is connected to the B+ line by its end terminal 53, to which line the cathode 6 of diode $D_2$ is also connected, and the other end terminal 63 of winding 13 is connected via a resistor 17 to the terminal 61 joining together anode 16 of diode $D_2$, cathode 5 of diode $D_1$ and winding 11 of $T_1$.

Winding 13 is also arranged so that when terminal 33 of primary winding 3 is more negative than terminal 43, terminal 63 of secondary winding 13 is more negative than terminal 53. Furthermore, when terminal 63 is more positive than terminal 53, then diode $D_2$ is in a conducting state, whereby it results that terminals 53 and 61 are shorted together, in effect. At the same time, if terminal 51 is more positive than terminal 61, the base 4 is necessarily more positive than emitter 24, for diode $D_1$ is biased to a non-conducting state and the negative side of the drop across winding 11 is in effect at B+ potential.

In other words, the previously-described blocking-action of the transistor $Q_1$, when its base is more positive than its emitter, is preserved.

Going back to the originally-defined condition, namely, terminal 51 more negative than terminal 61, terminal 63 more negative than terminal 53, under this condition diode $D_2$ obviously then stops conducting because its anode 16 is more negative than its cathode 6. As soon as the magnitude of the voltage at terminal 63 exceeds that of the voltage across resistor 28, cathode 5 of diode $D_1$ becomes more negative than its anode 15, and the diode therefore begins to conduct. This is because the voltage at terminal 61, due to winding 13, is now slightly more negative than that at terminal 18, hence, as the drop across winding 11 is now in such a sense as to drive terminal 51 even more negative than terminal 61, the base 4 becomes more negative than emitter 24, hence, current flows through inductance 2, creating $e_o$.

In the foregoing, circuit operation has been described supposing that $e_r$ and $e_s$ are in phase.

However, the condition originally stated for the creation of $e_o$ requires that $e_o$ not arise if the voltages $e_r$ and $e_s$ are 180° out of phase, i.e., in antiphase relationship.

Considering the antiphase case, if terminal 51 is negative with respect to terminal 61, and terminal 63 is going positive with respect to terminal 53, then diode $D_2$ conducts and diode $D_1$ does not, hence, terminal 51 becomes more positive than terminal 18 and transistor $Q_1$ obviously cannot conduct. As long as the amplitude of the drop across winding 11 does not exceed the drop across resistor 28, transistor $Q_1$ does not conduct.

On the other hand, if terminals 51 and 53 are becoming more positive than terminal 61, then diode $D_2$ does not conduct, whereas diode $D_1$ does. Consequently, as terminal 51 is becoming positive, transistor $Q_1$ ceases conducting when the magnitude of $e_s$ exceeds that of the drop across diode $D_1$.

While the foregoing has been explained in terms of in-phase or anti-phase relationship of $e_r$ and $e_s$, I have done so purely for convenience, i.e., the explanation is thereby simplified and it happens that the system shown in FIGURE 2 (shortly hereinafter to be described) ideally utilizes discriminator D in the mode described supra. However, the basic property of the discriminator of FIGURE 1 applies to the case wherein voltages $e_s$ and $e_r$ are only partly in phase, i.e., there is a phase difference between them of more than zero and less than 180°, for as long as both voltages are present, transistor 4 will conduct when base 4 thereby becomes more negative than emitter 24, and it is obvious that both of voltages $e_r$ and $e_s$ simultaneously will be driving terminal 51 negative at some time as long as their phase difference is less than 180°.

Figure 2:
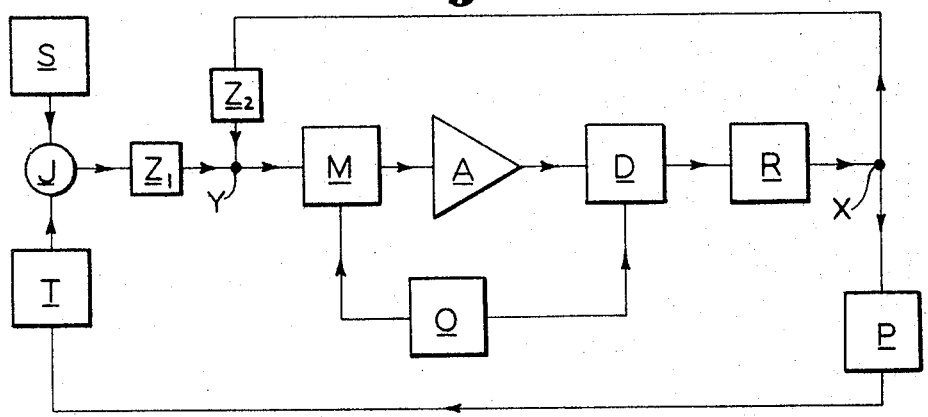
FIGURE 2 is a box diagram of a feedback control system incorporating discriminating means.

FIGURE 2 shows a feedback system wherein the discriminating properties described above are useful. The heart of the system is an AC amplifier A. The input to the system is represented by a summing junction J having the property of algebraically adding DC voltages applied thereto by boxes S and T and presenting the resultant voltage sum for processing by the feedback system. Since a DC voltage appears at point Y, a modulator M is provided to convert this DC voltage to an AC voltage suitable for amplification by amplifier A, such AC voltage being ultimately detected by a rectifier R with the result that at point X there appears a DC output signal in response to the original sum voltage, said DC output signal being ultimately applied to the box P.

Box P represents a so-called process, and it is to be supposed that some condition in the process, say temperature, changes in response to the signal at X, and that information as to the status of said condition is transferred from process P to box T, so that box T thus represents a so-called process variable transmitter having the property of transforming process condition information to a corresponding DC voltage.

It is desirable to establish certain functional relations between the sum voltage output at junction J and the ultimate effect thereof on the condition in process P, and hence boxes $Z_1$ and $Z_2$ represent impedances which operate on signals applied thereto, so as to present, at point Y, a net DC voltage the characteristics of which cause the output signal at X to have characteristics corresponding to said functional relations.

Normally, is is desired that the condition in process P be maintained at some fixed value, or that it follow some course of variation which is determined beforehand and/or by some entity external to the system. For this purpose, box S represents a so-called set point transmitter, or the like having the property of presenting to junction J a DC voltage corresponding to said fixed value, or to said course of variation.

The system is therefore arranged so that the sense of condition change in process P corresponds to the sense of output signal change at X, and that the sense of X is inverse to the sense of the difference, if any, between the voltages produced by transmitters S and T. In order to control the proportionality between the magnitude of the signal at X and the aforesaid difference, the feedback impedance $Z_2$ presents its voltage to junction Y with the sense corresponding to that of the signal at X.

Ordinarily, feedback impedance $Z_2$ is contrived to cause the feedback voltage to vary in magnitude in a way such as to suit the particular manner in which the process P responds to efforts to change the condition, whereby the rate at which the output signal at X changes, and/or the length of time over which it changes, will cause the proportionality relation between the voltage output of process variable transmitter T and the output signal at X to vary with time.

In a system of this sort, the sum voltage produced at Y should tend to zero or some predetermined small value, for the open loop gain of amplifier A is ordinarily quite high and, hence, negative feedback strongly resists change in the potential of point Y. However, it will be observed that unless the sense of change in the voltage at point Y is accompanied by a change in feedback voltage of such sense that the latter change opposes the former change, there is no negative feedback. Moreover, if the said latter change has a sense such as to exaggerate the said former change, the feedback will be positive, and hence the output at X will not have the desired characteristic of varying with time in such fashion as to exercise good control of the process.

The sense of change at point X, with respect to the sense of change at point Y, depends on what demodulator R does to the signal it receives. In this instance, it is contemplated that the demodulator R is a phase-insensitive device such as a simple rectifier system whose output terminals maintain a fixed polarity, independent of phase of the AC signal is rectifies. Therefore, supposing the voltage at X to be zero and then that it begins to change, the voltage at Y also changes and contributes to the change. If change in the positive direction at point Y elicits change in a negative direction at X, then the feedback sense is inverse, as desired, but with a phase-insensitive demodulator, this means that had the change at Y been in the negative direction, the change of X would have again been negative, and, hence, the feedback sense would have been positive, for the feedback voltage would attempt to drive point Y further negative.

In accordance with the invention, I prevent reversal of feedback by providing the discriminator D between amplifier A and rectifier R, thus permitting the demodulator R to be a phase-insensitive type. It will be seen that the contents of box D would consist essentially of most of those parts described above in connection with FIGURE 1, which last therefore corresponds to box D together with the output portion of amplifier A.

It is evident that $e_s$, FIGURE 1, corresponds to the carrier from oscillator O, modulated by modulator M, and that transformer $T_1$ represents the signal coupling between boxes A and D, FIGURE 2. Transformer $T_2$, on the other hand, represents the coupling between boxes D and O, in FIGURE 2, hence, $e_r$, FIGURE 1, represents unmodulated carrier from oscillator O.

Clearly, then, voltage $e_o$, FIGURE 1, represents not more of $e_s$ than is in phase with $e_r$, and exists only until the modulator M shifts the phase of $e_s$ by 180°. Since $e_o$ does not exist after the phase shift of 180°, no feedback voltage is presented to point Y after such phase shift. It will be noted, incidentally, that though the output of rectifier R is represented as splitting at point X to go to boxes F and P, the feedback may instead be taken from inductance 2 by means of a rectifier (not shown) separate from rectifier R. However, save for discriminator D, the system of FIGURE 2 is well known in the art, and the present invention is not concerned with precisely how and where $e_o$ is transformed into a DC feedback voltage and/or caused to influence the condition in process P, and so forth.

In the foregoing, for convenience, the operation of the system of FIGURE 2 has been discussed from the point of view of signal change relative to zero levels. Actually, the reference level need not be zero. Thus, in many real systems, the sum voltage at J is never zero and varies over a range exclusively of only one sign. However, the changes of voltage are positive or negative depending on toward which end of the said range they are directed, likewise for the voltage at X. Under these circumstances, zero volts out from the discriminator D corresponds to one end of said range and its maximum output to the other end of said range. As this is a familiar situation to those skilled in the art, it is unnecessary to discuss it further, and I only mention it to make it clear that the system problem solved by my novel discriminator exists independently of signal levels as such, and that the solution of that problem is independent of signal levels as such, whereas it is rather the senses of level changes that must be particularly considered.

The system of FIGURE 2 has been described supposing the amplifier and oscillator outputs applied to discriminator D as being either fully in or fully out of phase. In a real system, however, it is likely that there will be some deviation from these relationships. For example, there might be a 15° phase difference which would mean that at such times as $Q_1$ is supposed to be conducting it would conduct for 15° less than a full half-cycle, whereas at times it should not conduct it might conduct for 15° of a full half-cycle, the unwanted intervals of conduction occurring as extreme portions of half-cycles of non-conduction and conduction. However, with sinusoidal excitation, the discriminator D has a sampling property which enables the conduction periods to be restricted to an intermediate portion of the conduction half-cycle.

This sampling property is controlled by the relation of the magnitude of the voltage across winding 13 to the magnitude of the voltage across resistor 28. Thus, if $e_r$ is passing through zero in such direction as to begin to drive terminal 63 negative with respect to terminal 53, a point will be reached when the amplitude of the voltage of terminal 63 will reach and surpass that at terminal 18. Up to this point the voltage at terminal 61 will be the same as at terminal 63, as no current flows through resistor 17, because diodes $D_1$ and $D_2$ are non-conducting, but now diode $D_1$ begins to conduct because said voltage becomes more negative than the voltage at 18. It is evident that the smaller the voltage across resistor 28 is in comparison to the voltage across winding 13, the sooner (in the half-cycle of negative going voltage at terminal 63) diode $D_1$ starts to conduct. Conversely, the nearer the amplitude of the former voltage approaches the peak value of the latter voltage, the nearer to the half-way point of said half-cycle does diode $D_1$ start to conduct.

When the voltage of terminal 63 starts back to zero toward positive values, conduction of diode $D_1$ stops at a point in the half-cycle of conduction as far from the end of the half-cycle, as the point at which conduction begins was from the beginning of the half-cycle. As the transistor $Q_1$ can conduct during the conduction of diode $D_1$, as explained in connection with FIGURE 1, how much of the half-cycle in which $Q_1$ can conduct can be set by raising or lowering the latter voltage with respect to the former.

The relative values of the peak AC voltage across winding 13 and the DC voltage across resistor 28 can vary widely, as once the diode $D_1$ fires, the voltage at terminal 61 remains nearly fixed, for the excess over the voltage at 18 is taken up by resistor 17, whence it results that the voltage at terminal 61 is that at terminal 18 plus a small slightly-varying component due to the dynamic resistance of diodes $D_1$ in its conducting state.

It will be observed that the particular concern here is not with determining when the transistor $Q_1$ shall conduct during any half-cycle in which conduction is desired to take place, but is rather in assuring that the transistor will indeed not conduct anywhere in the next succeeding half-cycle. However, it is obvious that if there is some reason for selecting a particular portion of half-cycle in which conduction is permissible, the sampling feature is useful apart from the matter of assuring that conduction does not occur in the next succeeding cycle.

From FIGURE 1 it will be seen that the output end of amplifier A includes a transistor $Q_2$ having base electrode 34, collector electrode 44 and emitter electrode 54, the output current of transistor $Q_2$ being taken through winding 1 which connects to emitter 44 via terminal 41, so that collector 44 is therefore connected to B— at terminal 31. A capacitor 22 interconnects terminal 41 with a terminal 45 to which last terminal the cathode 26 of a diode $D_4$ and the anode 35 of a diode $D_3$ are connected, anode 36 of diode $D_4$ being connected to B—. A pair of resistors 37 and 57 connected together at a terminal 47 and in series between B— and B+ provide a voltage divider, the cathode of diode $D_3$ being connected to terminal 47.

A resistor 27 connects emitter 54 of transistor $Q_2$ to B+, and resistors 38 and 58, connected together at a terminal 48, and in series between B— and B+, provide another voltage divider, the base 34 of transistor $Q_2$ being connected to terminal 48.

Diodes $D_3$ and $D_4$, capacitor 22, and resistors 37 and 57 represent an addition to an otherwise conventional transistor-amplifier stage. Such addition has the purpose of assuring that the voltage across winding 11 is never sufficiently negative at terminal 51 to turn on transistor $Q_1$ at such times as diode $D_2$ is conducting. Also, it is found that transistor $Q_2$ is likely to break out into oscillations when the drop across winding 1 becomes high enough. Diodes $D_3$ and $D_4$, by limiting this drop to a value less than that causing the transistor to oscillate, serve to prevent such oscillation.

Assuming diodes $D_3$ and $D_4$ to be exactly alike, if the voltage across resistor 37, referred to B—, is +2E, then the voltage across each said diode is +E, and the voltage across winding 1 and capacitor 22, in series, is $+E+e_s$. Whenever $e_s$ has the minus sign, and its amplitude becomes greater than E, it will be evident that terminal 41 becomes more negative than terminal 31, i.e., B—, hence, diode $D_4$ will begin to conduct and thereby prevent the amplitude of $e_s$ from more than just exceeding E.

On the other hand, when $e_s$ has the positive sign, and its amplitude becomes greater than E, it will be evident that diode $D_3$ will begin to conduct and thereby prevent the amplitude of $e_s$ from more than just exceeding E. That is, in algebraic terms, $$|e_s| \leq E$$

and if $e_s$ attempts to exceed the limit of the range of values defined in the inequality supra, one or the other of diodes $D_3$ and $D_4$ will conduct and limit $e_s$ to a value of $\pm E$. When $e_s$ is in said range, neither diode conducts significantly, of course.

As E is determined by the drop across resistor 37, it is set by choosing relative proportions of resistors 37 and 57 such that the voltage at terminal 47, referred to B—, is 2E, where E is equal to a magnitude such that $e_s$ remains at values insufficient to produce a voltage across winding 11 such as would cause $Q_1$ to conduct except at such times as terminal 51 is more negative than terminal 61, and diode $D_1$ is simultaneously conducting.

Diodes $D_3$ and $D_4$, in practice, will not be precisely alike, and there are voltage drops involved, due to dynamic resistance of the diodes, to the impedance of the winding 1, and so on, so that the limiting values of $e$ will not be precisely $\pm E$. However, the deviation from ideality is slight, and, if necessary, can be substantially neutralized by routine expedients such as matching diodes, padding one or the other diode out with series resistance, and the like, without departing from the invention herein.

FIGURE 3 shows a modification of the discriminating part of the circuit of FIGURE 1. Except as will be explained hereinafter, operation of the circuit of FIGURE 3 as as set forth in connection with FIGURE 1. As indicated, by the use of many of the reference numerals used in FIGURE 1, FIGURE 3 illustrates only what is shown looking to the right from D, FIGURE 1, except that diodes $D_5$, $D_6$ and $D_7$ have been added, resistor 17 is lacking, resistors 97 and 107 (actually it corresponds to resistor 17) have been added, and the collector 14 of transistor $Q_1'$ is no longer connected directly to B—.

To begin with, diodes $D_5$ and $D_6$ provide for alternately connecting terminals 61 and 63 to the common junctions of the anodes of said diodes. When terminal 63 goes positive with respect to terminal 53, current flows between these terminals via resistor 97, diode $D_5$ and diode $D_2$, in effect connecting terminal 87, i.e., the common junction of the anodes of diodes $D_5$ and $D_6$, and resistors 97 and 107, to terminal 53. As a result, the potential of the emitter of transistor $Q_1$ becomes more negative than the potentials of the transistor's base and collector, and therefore ordinarily can produce no current flow through winding 2. However, since conditions can exist that nevertheless would cause current to flow into the transistor collector and out the transistor emitter, a diode $D_7$ is connected between the collector and diodes $D_5$ and $D_6$, the anodes of the latter being connected to the cathode of the $D_7$, and the anode of $D_7$ being connected to the collector of transistor $Q_1$, so that the cathode of $D_7$ is connected to terminal 87.

The above-described action occurs every other half-cycle of $e_r$. In the remaining half-cycles of $e_r$, terminal 63, of course, becomes negative with respect to terminal 53, and on these occasions current flows through capacitor 12 and resistor 28 in parallel, diode $D_1$, resistor 107, and diode $D_5$, whenever terminal 63 becomes more negative than terminal 18. In effect, then, terminal 63 is connected to terminal 87, and terminal 61 is connected to terminal 18. As a result, the current flowing through resistor 107 produces a drop the sense of which makes the bias resistor 107 produces a drop the sense of which makes the bias polarity for emitter and collector of transistor $Q_1$, of such sign that if terminal 51 is going negative with respect to terminal 61, transistor $Q_1$ conducts, as is desired. If, however, the terminal 51 is going positive, the base of transistor $Q_1$ remains more positive than its emitter, and the transistor does not conduct, as is also desired. As diode $D_7$ is forward biased at this time by the potential at terminal 87, the collector of transistor $Q_1$ is, in effect, connected to terminal 87.

It will be observed that the discriminator action of FIGURE 3 is essentially the same as that described in connection with FIGURE 1, except that in FIGURE 3, both collector and base bias are controlled by the action of the circuit, whereas in the case of FIGURE 1, the collector voltage remains fixed. As the resistor 107 performs the function of resistor 17, FIGURE 1, the changes which change the FIGURE 1 version of the discriminator, to that of FIGURE 2, are adding diodes $D_5$, $D_6$ and $D_7$, and resistor 97, and connecting the collector of transistor $Q_1$ (via diode $D_7$) to terminal 87, i.e., the common junction of resistors 97 and 107 and the anodes of diodes $D_5$ and $D_6$, instead of directly to B—.

FIGURE 4 shows yet another modification of the discriminator D of FIGURE 1. The circuit of FIGURE 4, like the circuit of FIGURE 3, is still essentially that of discriminator D, as indicated by the use of the same reference numerals, insofar as possible. However, the modification shown in FIGURE 4 goes substantially beyond the discriminating action exhibited by its predecessors, namely, in FIGURE 4, the circuit either operates very much as is explained in the case of FIGURE 1, and to the same dicriminating effect, or, instead, it operates to disable the discriminating action, and to provide instead straight amplifying action.

Considering the overall circuit shown in FIGURE 1, it will be observed that the amplifying section A (essentially a class A amplifier stage) and the discriminator D, together constitute, in effect, a class C amplifier, because power is supplied to winding 2 for appreciably less than one half-cycle, per cycle. This, of course, is the direct consequence of the polarity and phase selecting properties of discriminator D which, in turn, are relied on to prevent positive feedback at point Y.

However, there are times when the sum signal at junction J is such that the action of discriminator D is not needed, that is, feedback to point Y would be negative apart from the action of the discriminator. In FIGURE 4, I have shown a modification of discriminator D providing for eliminating the discriminator effect and converting transistor $Q_1$ to straight class A amplification, at such time as it is desirable and useful to do so.

Looking at FIGURE 4, the modification will be seen to consist of adding capacitor 72 between terminal 61 and resistor 17, adding resistor 77 between junction 18 and resistor 7, adding capacitor 62 between the junction of resistors 7 and 77 and the B— line, inserting a winding 92 of a transformer $T_3$ between the collector of transistor $Q_1$ and B—, omitting winding 2, connecting terminal 61 to winding 11 via a resistor 88, connecting the openable and closable contacts 50 of an SPST relay V between B— and a resistor 68, connecting resistor 68 to the junction of resistor 88 and winding 11, and bypassing resistor 68 with a capacitor 82.

Transformer $T_3$ has a winding 102 coupled to winding 92 by a core 112. As shown, winding 102 is a split winding having its center connected to one side of capacitor 122 and to a terminal 10, its ends being connected by diodes $D_8$ ad $D_9$ to the other side of capacitor 122 via a choke 132. The junction of choke 132 and capacitor 122 is connected to one end of a load resistor 98, the other end of the said resistor 98 being connected to a second terminal 10. It will be seen that save for the gap between the terminals 10, winding 102, etc., define a conventional type of full-wave rectifier circuit.

Relay V is of the current-operated type having a winding 50 which exerts a contact-closing force when sufficient DC current flows through said winding, whereas below a certain value of DC current therein, the contacts open under the bias of spring force, or the like, provided by suitable means (not shown). For example, relay V may be a conventional "reed relay," so-called.

Winding 50 is to be supposed to be bridged across terminals 10, hence, at the ends of the winding are shown terminals 20, which may be supposed to be either identically terminals 10, or the termini of a pair of DC conductors connected to terminals 10, so as to complete the rectifier circuit via winding 50. The contacts 60 are illustrated in the closed condition, hence, FIGURE 4 represents the condition wherein sufficient AC current flows in winding 92, that the resultant DC current through winding 50 suffices to maintain contacts 60 closed, thereby providing a DC path, via contacts 60 and resistors 68 and 88, between terminal 61 and a terminal 30 of the B-line.

When contacts 60 are closed, diode $D_2$ is forward biased, thereby effectively removing from diodes $D_1$ and $D_2$, the driving signal due to winding 13, by bypassing said signal through capacitor 12.

Consequently, transistor $Q_1$ is supplied with a quiescent base current and is biased for class A operation. Hence, if there is a signal on winding 11, at all times there will be a DC current through resistor 98, under these conditions. Supposing resistor 98 to represent the input resistance of the ultimate load (e.g., a valve controlling the variable condition in process P), the effect of a given change in such condition on the ultimate load will be much greater than if the non-class A action developed in the circuit of FIGURE 1 were now effective. In other words, the gain of the control loop (J to P via Z, etc., and from P back to J via T, FIGURE 2) would be higher under the class A condition represented in FIGURE 4, than under the class C condition of FIGURE 1.

Since the process condition in process P can be lower or higher than the value predetermined by the set point transmitter S, the algebraic sum of voltage at junction J can be either positive or negative. As explained previously, the signal at X never changes sign.

For summing junction voltages of one sign only the sense of feedback from point X is negative. The discriminator cuts off the feedback during each alternate half-cycle, because of its phase and polarity sensing properties which provide for cutting off the feedback during all cycles when the summing junction voltage is such that the feedback would be positive.

Now previously the range of control signal applied to the process P has been exemplified as (4–20) ma. If the control device is a valve, for example, the arrangement might be typically that the valve is just fully-closed at 4 ma. and just fully open at 20 ma. Further, for values between 4 ma. and 20 ma., the valve is partly open, to an extent proportional to the current (the proportionality may be either linear or non-linear), and the last said values correspond to a range of sum voltages at junction J. Typically, such a voltage range is entirely negative, whereas the actual range of voltage at junction J includes both positive and negative values, thus giving rise to the feedback-reversal problem cured by the discriminator of FIGURE 1, but as pointed out supra, the "cure," insofar as FIGURE 1 (and FIGURE 3) is concerned is only necessary for one sign of voltage at point Y. Therefore, according to the invention, I arrange matters so that the "cure" is withheld when unnecesary, and also design the various entities of the system of FIGURE 2 such that the feedback voltage at Y is positive in polarity and the "cure" becomes unnecessary whenever the voltage at junction J is negative. For example, the system could have a circuit common (not shown) with respect to which the junction of the capacitor 122 and inductance 132 is positive, supposing point Y is negative with respect to such circuit common, in which case the last said junction could serve as point X. Ideally, therefore, the relay V is chosen so that it opens below 4 ma. and closes at 4 ma. (However, a practical relay, if it closes at 4 ma., will stay closed till the current drops somewhat below 4 ma., as is well known, so it is, of course, necessary to choose the relay to be one that drops out before the current in coil 50 becomes zero).

The advantage of this arrangement is that the system of FIGURE 2 has more gain when the current in resistance 98 is in the (4–20) ma. range, because transistor $Q_1$ operates class A rather than class C. This means that changes in valve opening occur more quickly and positively than if the discriminating effect were applied during the (4–20) ma. region of valve action. On the other hand, if the voltage at junction J goes sufficiently positive, the valve will reach a fully closed state at 4 ma. and stay there, even though point Y actually goes positive, for before point Y goes positive, contacts 60 opens and the discriminating action of the circuit now holds the load current at approximately zero ma. and at least below 4 ma. It will be observed that without the discriminating action (i.e., if contacts 60 remained closed), at some sufficiently positive value of the voltage of junction J, the feedback of positive voltage to point Y would quickly bring the current in resistance 98 into the (4–20) ma. range, therefore opening the valve in spite of the fact that a positive voltage at junction J means that the process condition is at a value such that the valve should remain closed. For example, the valve might be controlling the supply of liquid to a container from which varying quantities of such liquid is concurrently drawn, so that a positive voltage at junction J would mean that the tank is approaching fullness because little or no liquid is being drawn from it. Clearly, it is undesirable that such positive voltage should result in the valve opening and supplying more liquid.

It may be noted here that the action in FIGURES 1 and 4 have one important feature in common, this being that in each, the effect of phase-sensitive demodulation is obtained at a saving in power. That is, the end result is that the signal at point X is in each case, and insofar as it is effective at point Y, is never such as to create a positive feedback condition. This property, however, is obtained in conventional phase-sensitive demodulators generally, at the price of substantial amounts of power, as compared to the present invention. Thus, such demodulators, like the present invention require sources of reference voltage. However, though the voltage requirements can be similar, in the conventional case, much more current is required of the reference source, than in the present invention. For example, a phase-sensitive rectifier applies its voltage to the same network of resistances as does the voltage of the signal being demodulated, which means that the reference source works at the same power level as does the signal source. In the present invention, however, the reference sources are involved in nothing more power-requiring than turning diodes $D_1$ and $D_2$ on and off, which requires only a small amount of current, typically at least an order of magnitude less than would be required by a phase-sensitive rectifier.

The circuit of FIGURE 1 has been found to operate satisfactorily, and in accordance with the foregoing description, if constructed using parts of the values given in the following list:

| | |
|---|---:|
| Resistor 7 | 10 |
| Resistor 8 | 1,500 |
| Resistor 17 | 15,000 |
| Resistor 27 | 4,700 |
| Resistor 28 | 1,200 |
| Resistor 37 | 680 |
| Resistor 38 | 27,000 |
| Resistor 57 | 1,000 |
| Resistor 58 | 47,000 |
| Capacitor 12 | 1.0 |
| Capacitor 22 | 0.1 |
| Capacitor 32 | 1.0 |
| Capacitor 42 | 0.047 |
| Inductor 2 _____microhenrys | 200 |
| Transistor $Q_1$ | 2N219 |
| Transistor $Q_2$ | GI 761R |
| Diode $D_1$ | IN34A |
| Diode $D_2$ | IN34A |
| Diode $D_3$ | IN659 or IN914 |
| Diode $D_4$ | IN659 or IN914 |

The above resistance values are in ohms, ±10% carbon resistors having nominal values as given above being suitable. Capacitance values are given above in microfarads and are chosen for 100 kc. operation, the frequency of the output of oscillator O, and, therefore, of $e_s$ and $e_r$.

Transformers $T_1$ and $T_2$ are also designed with 100 kc. operation in mind. The turns ratio of $T_2$ can be whatever value is necessary to give the voltage swing across winding 13 required for the desired discriminating action. Transformer $T_2$, however, is mainly designed to provide good impedance matching and, in the case of the above set of parts specifications, it results that a 4:1 input to output turns-ratio is satisfactory in this respect.

A suitable value for the voltage between B— and B+ is 24 volts.

The circuits of FIGURES 3 and 4 can also use the set of parts values given above for FIGURE 1. Where additional parts are involved, as particularly in the case of the circuit of FIGURE 4, it is within the ordinary, routine skill of the art to determine proper values for such additional parts.

Numerous modifications of my invention will be obvious to those skilled in the art. Thus, NPN transistors may be used instead of the PNP transistors shown by suitably rearranging the circuitry. In FIGURE 1, for example, $Q_1$ might be changed to NPN, while $Q_2$ remained PNP or vice versa. A complementary symmetry version of the disclosed circuit would not depart from the principles outlined herein.

Again, as will be evident to those skilled in the art, from the description herein, the useful output ($e_0$, the current at X, FIGURE 2, or the like) can be derived in various ways and/or take various forms, without departure from the essence of the invention disclosed herein. I therefore consider that variations such as these are not exempt from the invention as claimed.

The description herein has particular reference to use of my invention in connection with the art of process control. A further consideration of this art and of controller and system circuitry used therein is to be found in disclosures such as in U.S. Letters Patent Nos. 3,127,105 and 3,069,554, to N. B. Nichols and R. M. Decker et al., respectively, both patents being assigned to the assignee of the present invention. Reference should be had thereto should examples be desired as to particular forms that may be taken by such elements of the system as $Z_1$ and $Z_2$, and so on.

While the patent systems and circuitry do not involve phase insensitivity and are in terms of straight DC operation, it will be observed that, in the system of FIGURE 2 of the present application, boxes M, A, D, R and O, collectively, represent a DC amplifier, and $Z_1$ and $Z_2$, see FIGURE 2, correspond to the input and feedback impedance networks for the DC amplifier in the control circuit of FIGURE 1 of the Nichols patent. The basic elements of such networks are also shown segregated by the dashed outline 42 in FIGURE 2 of the Decker et al. patent.

This reference to the patent literature is purely exemplary, and I do not believe that my invention is limited to circuitry, instrumentalities and/or systems such as described in the said patents. Hence, while my invention has been delineated herein in the manner prescribed by the statutes relating to U.S. Letters Patent, the bounds of my invention are to be sought in the claims appended hereto, rather than in the preceding description thereof.

I claim:

1. In a feedback system having an amplifier providing an AC output signal, a demodulator receiving said AC output signal and operative to produce a DC output signal representative of said AC output signal, and feedback means applying a DC feedback signal to said amplifier so as to cause said amplifier to modify said AC output signal, said DC feedback signal being representative of said DC output signal; the combination with said demodulator and said amplifier of discriminating means allowing but one phase and one polarity of said AC output signal to be received by said demodulator; said discriminating means including a transistor having said AC output signal applied to the base thereof, said transistor having a load circuit connecting together its emitter and its collector; said load circuit having impedance therein arranged to have the transistor's emitter-collector current flow therethrough; said demodulator being responsive to voltage drop across said impedance whereby to produce said DC output signal; said discriminating means including switching means operative in a first condition to allow said emitter-collector current to flow when said AC output signal has said one phase and said one polarity; said switching means also being operative in a second condition when said AC output signal has said other polarity, to cause the base-emitter junction of said transistor to be so biased as to prevent said current flow.

2. The invention of claim 1, wherein said switching means includes a source of AC reference signal, said switching means also including means responsive to said AC reference signal and to the phase and polarity relations between said AC reference signal and said AC output signal to prevent said emitter-collector current flow except at such times as said AC reference signal and said AC output signal simultaneously have said phase and polarity.

3. The invention of claim 1, wherein said switching means includes a source of AC reference signal, and there being means providing bias voltage for the emitter of said transistor such as to render said junction nonconductive when the voltage of said base has the same sign as said bias voltage, and the amplitude of the voltage of said base is smaller than that of said bias voltage; said bias voltage being connected in series with said AC output signal; said switching means also including means responsive to said AC reference signal to cancel said bias voltage from said base at such times as the said AC reference signal and the said AC output signal have the desired phase, and the polarity of said AC output signal is opposite to the polarity of said bias voltage.

4. The invention of claim 1, wherein said system includes means responsive to DC input signal such as to cause said amplifier to produce said AC output signal with a phase corresponding to the polarity of said DC input signal, said DC feedback signal being effectively applied so as to provide negative feedback for said amplifier; said demodulator being constructed and arranged so that said DC feedback signal never changes its polarity; said one phase of said AC output signal corresponding to polarities of said DC feedback and input signals as would cause positive feedback, whereas said other phase of said AC output signal corresponds to polarities of said DC feedback and input signals such as would cause negative feedback; said system also including further switching means, said further switching means being responsive to current flow through said impedance to bias said transistor for amplification of said AC output signal regardless of polarity whenever said AC output signal has said other phase.

5. The invention of claim 1, wherein said amplifier also includes a transistor, there being circuitry constructed and arranged such that the collector current of the last said transistor provides said AC output signal and such that said output signal can attain a magnitude that is sufficiently large when it has said one polarity as to cause the first said transistor to conduct in spite of said switching means; said system also including limiting means, said limiting means being responsive to said AC output signal such as to prevent said AC output signal from attaining said magnitude.

6. The invention of claim 1, wherein said amplifier is provided with a limiter, said amplifier and said limiter comprising a transistor, a first diode and a second diode, a first impedance and a second impedance, and a source for powering and biasing said transistor, there being circuitry interconnecting said transistor and said DC source such that a signal effectively applied between the base and emitter causes current to flow between the collector and the emitter of said transistor, said collector being connected to one side of said DC source via said first impedance, said collector being connected to one electrode of said first diode, and the other electrode of said first diode being connected to said one side of said DC source; said second diode having one electrode connected to said one electrode of said first diode, the last two said electrodes of said diodes being unlike, and said second impedance connecting said DC source to the other electrode of said second diode such as to apply to the last said electrode a voltage that is both more negative than one side of said DC source and more positive than the other side of said DC source; said second diodes being so polarized that the last said voltage maintains both said diodes in a reverse-biased state unless the magnitude of the voltage of said collector becomes sufficiently large to cause one or the other of said diodes to become forward-biased; whereby the voltage across said first impedance is limited to a magnitude substantially equal to the voltage drop such as exists across one of said diodes when such diode is in a reverse-biased state.

7. In a feedback system having a demodulator of the type wherein the output signal thereof always has the same polarity, means providing a feedback signal of corresponding polarity, and a first AC source, the arrangement being that said AC source produces an AC output signal of one phase or another and said feedback signal is positive or negative in its effect on said system depending on the phase of said AC output signal; the improvement comprising a phase and polarity discriminator, said discriminator including a transistor arranged to receive said AC output signal and to produce in response thereto a corresponding AC signal, said corresponding AC signal being demodulated by said demodulator, said discriminator being constructed and arranged that said corresponding AC signal is produced only when said AC output signal has said one phase and a given polarity such that said feedback signal is negative in its effect on said system.

8. The invention of claim 7, including a second AC source providing an AC reference signal; biasing means responsive to said reference signal to bias said transistor against producing said corresponding AC signal when said AC reference signal and said AC output signal are of opposite polarity or said AC output signal has a polarity opposite to said given polarity.

9. The invention of claim 8, and said discriminator includes wherein said biasing means includes a DC source of DC bias for said transistor, a first diode connected across said second AC source and a second diode connected between one side of said DC source and one side of said first AC source, the other side of said first AC source being connected to said transistor, said first diode having one electrode connected to said one side of said first AC source and its other electrode connected to the other side of said DC source; said one side of said DC source biasing said transistor against producing said corresponding AC signal; said diodes being polarized such that when said AC output signal and said reference signals are in phase and the said other side of said first AC source has said given polarity, said second diode conducts and said first diode does not; said DC source being polarized such that the bias thereof is disconnected from said one side of said first AC source by said first diode.

10. The invention of claim 9, including switching means having a first condition wherein said one side of said first AC source is connected to bias means, said bias means being such as to cause said first diode to conduct, irrespective of the phase and polarity of said AC output signal, said switching means also having a second condition wherein said bias means is disconnected from said one side of said first AC source; and means constructed and arranged to operate said switching means between said first condition and said second condition.

11. The invention of claim 10, wherein the last said means is effectively responsive to said corresponding AC signal when said AC signal is in a given range to maintain said switching means in said second condition, and to maintain said switching means in said first condition when said corresponding AC signal is outside of said range.

12. An amplifier and limiter combination comprising a transistor, a first diode and a second diode, a first impedance and a second impedance, and a source for powering and biasing said transistor, there being circuitry interconnecting said transistor and said DC source such that a signal effectively applied between the base and emitter causes current to flow between the collector and the emitter of said transistor; said collector being connected to one side of said DC source via said first impedance, said collector being connected to one electrode of said first diode, and the other electrode of said first diode being connected to said one side of said DC source; said second diode having one electrode connected to said one electrode of said first diode, the last two said electrodes of said diodes being unlike, and said second impedance connecting said DC source to the other electrode of said second diode such as to apply to the last said electrode a voltage that is both more negative than one side of said DC source and more positive than the other side of said DC source; said diodes being so polarized that the last said voltage maintains both said diodes in a reverse-biased state unless the magnitude of the voltage of said collector becomes sufficiently large to cause one or the other of said diodes to become forward-biased; whereby the voltage across said first impedance is limited to a magnitude substantially equal to the voltage drop such as exists across one of said diodes when such diode is in a reverse-biased state.

13. In combination, a source of modulated AC, a source of reference AC, a transistor, a first diode, a second diode, a source of DC, and a load impedance, the first two said sources having the same frequency and being connected in series with each other and the base of said transistor; the emitter of said transistor being connected to said source of DC, and said load impedance being connected in the emitter-collector circuit of said transistor; said first diode being connected across said source of reference AC; and said second diode being connected between the connection of said first two said sources and the connection between said emitter and said source of DC, whereby one electrode of said first diode is connected to the former said connection; said diodes being so poled that when the voltages of said first two said sources add arithmetically, the said first diode is on and the said second diode is off, whereas when said voltages subtract arithmetically, the said first diode is off and the said second diode is on; said source of modulated voltage being such that the voltage thereof is less than the voltage of said source of DC when both the last said voltages have the same sign, and the PN character of said transistor and diodes being such that the transistor is on solely when said last said voltages have the same sign, and the magnitude of the voltage of said source of DC is less than the magnitude of the voltage of said source of reference AC, whereby current flows through said load impedance solely at times when the voltages of said first two said sources have the same sign as each other and as the connection of said source of DC to said emitter.

14. The invention of claim 13, wherein one side of said source of DC is connected to said collector, and the other side of said source of DC is connected to the other electrode of said first diode, circuitry interconnecting said sides and providing a terminal the potential of which is intermediate the potentials of said sides, said emitter being connected to said source of DC by means of said terminal, said emitter being connected to said terminal via said load impedance.

15. The invention of claim 13 including circuitry interconnecting the sides of said source of DC and providing a terminal the potential of which is intermediate the potentials of said sides, a third diode, a fourth diode and a fifth diode; and a pair of resistances connected in series with each other, said pair of resistances being connected between said AC sources, and the said former said connection being made to said second source via said pair, said third diode being connected across one resistance of said pair, said fourth diode being connected across the other resistance of said pair, and said fifth diode connecting said collector to the junction between said resistances, whereby each of said third, fourth and fifth diodes have one electrode connected to said junction; said fifth diode being poled to permit flow of collector current when current flows through said load impedance, like electrodes of said third and fourth junction being connected to said junction, and the electrode of said fifth diode connected to said junction being unlike the former said like electrodes.

16. The invention of claim 13, wherein one side of said source of DC is connected to said collector via said load impedance, and the other side of said source of DC is connected to the other electrode of said first diode, circuitry interconnecting said sides and providing a terminal the potential of which is intermediate the potentials of said sides, said emitter being connected to said source of DC via said terminal.

17. The invention of claim 16, wherein a first capacitor is arranged to bypass AC between the collector and emitter of said transistor, a second capacitor interconnects said AC sources, and the said one electrode of said first diode being connected to the side of said capacitor next said first source, bias circuitry interconnecting said side of said capacitor and said one side of said source of DC, there being switch means provided to connect and disconnect said bias circuitry from said one side of said source of DC, said bias circuitry being so constructed and arranged that when said switch means connects said bias circuitry to said one side of said source of DC, said transistor is substantially a class A amplifier.

18. The invention of claim 17, including rectifier means effectively responsive to the current through said load impedance to provide a DC output signal, said switch means being responsive to said DC output signal to connect said bias circuitry to said one side of said source of DC, and to disconnect said circuitry from said bias circuitry if said DC output signal departs from a given range of values thereof.

References Cited

UNITED STATES PATENTS

| | | | |
|---|---|---|---|
| 3,204,190 | 8/1965 | Broadhead | 329—119 |
| 3,305,734 | 2/1967 | Buttenhoff | 328—3 |
| 3,314,018 | 4/1967 | Taylor et al. | 329—192 X |

NATHAN KAUFMAN, *Primary Examiner.*

U.S. Cl. X.R.

307—235; 329—192; 330—14, 21, 24